United States Patent
Binder et al.

(10) Patent No.: US 10,125,872 B2
(45) Date of Patent: Nov. 13, 2018

(54) RECIPROCATING SEAL FOR HIGH PULSATING PRESSURE

(75) Inventors: Michael Binder, Foothill Ranch, CA (US); Amin Tariq, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 258 days.

(21) Appl. No.: 13/586,773

(22) Filed: Aug. 15, 2012

(65) Prior Publication Data

US 2013/0043661 A1    Feb. 21, 2013

Related U.S. Application Data

(60) Provisional application No. 61/524,844, filed on Aug. 18, 2011.

(51) Int. Cl.
| | |
|---|---|
| *F16J 15/322* | (2016.01) |
| *F16J 15/3236* | (2016.01) |
| *F16J 15/56* | (2006.01) |

(52) U.S. Cl.
CPC ......... *F16J 15/322* (2013.01); *F16J 15/3236* (2013.01); *F16J 15/56* (2013.01)

(58) Field of Classification Search
CPC ... F16J 15/3288; F16J 15/3264; F16J 15/3236
USPC ....... 277/350, 351, 550, 551, 554, 562, 564, 277/568, 569
See application file for complete search history.

(56) References Cited

U.S. PATENT DOCUMENTS

| | | | | |
|---|---|---|---|---|
| 1,331,216 A | * | 2/1920 | Schneider | F16J 15/46 277/562 |
| 3,218,087 A | * | 11/1965 | Hallesy | F16J 15/3208 277/532 |
| 3,302,953 A | | 2/1967 | Glasgow | |
| 3,647,227 A | * | 3/1972 | Lojkutz | F16J 15/38 277/373 |

(Continued)

FOREIGN PATENT DOCUMENTS

| | | |
|---|---|---|
| DE | 2759141 A | 7/1979 |
| EP | 2 233 798 A1 | 9/2010 |

(Continued)

OTHER PUBLICATIONS

European Search Report dated Nov. 18, 2013 from corresponding European Application No. 12180721.8 (5 pages).

(Continued)

*Primary Examiner* — Nathan Cumar
(74) *Attorney, Agent, or Firm* — Klein, O'Neill & Singh, LLP

(57) ABSTRACT

Device, system, and method are described directed to seal assemblies with support to reduce seal extrusion under high to very high pressure changes due to repeated piston reciprocating movement. In some examples, concave features are incorporated on the inner and outer edges of support and backup ring elements to support and hug the preceding element and constrain extrusion, as well as utilizing multiple contact points on certain elements in order to reduce friction against the dynamic surface. The seal assemblies described herein can also incorporate bearing surfaces to reduce damage to seal ID due to off-axis floating rod, such as incorporating one or more multi-point contacts to reduce friction.

25 Claims, 6 Drawing Sheets

(56) References Cited

U.S. PATENT DOCUMENTS

| | | | | |
|---|---|---|---|---|
| 4,050,701 | A | * | 9/1977 | Webb ........................... 277/422 |
| 4,592,558 | A | * | 6/1986 | Hopkins .............. F16J 15/3212 |
| | | | | 277/530 |
| 4,655,462 | A | * | 4/1987 | Balsells .................. F16F 1/045 |
| | | | | 267/1.5 |
| 4,655,945 | A | | 4/1987 | Balsells |
| 4,804,290 | A | | 2/1989 | Balsells |
| 4,805,943 | A | | 2/1989 | Balsells |
| 5,072,070 | A | | 12/1991 | Balsells |
| 5,079,388 | A | | 1/1992 | Balsells |
| 5,091,606 | A | | 2/1992 | Balsells |
| 5,117,066 | A | | 5/1992 | Balsells |
| 5,134,244 | A | | 7/1992 | Balsells |
| 5,161,806 | A | | 11/1992 | Balsells |
| 5,265,890 | A | * | 11/1993 | Balsells ....................... 277/467 |
| 5,358,224 | A | | 10/1994 | Balsells |
| 5,472,216 | A | * | 12/1995 | Albertson et al. ............ 277/530 |
| 5,474,309 | A | | 12/1995 | Balsells |
| 5,518,257 | A | | 5/1996 | Breaker |
| 5,575,487 | A | | 11/1996 | Balsells |
| 5,599,027 | A | | 2/1997 | Balsells |
| 5,700,013 | A | * | 12/1997 | Baty .................... F16J 15/3464 |
| | | | | 277/340 |
| 5,979,904 | A | | 11/1999 | Balsells |
| 5,984,316 | A | * | 11/1999 | Balsells ....................... 277/553 |
| 5,992,856 | A | | 11/1999 | Basells et al. |
| 6,050,572 | A | | 4/2000 | Balsells et al. |
| 6,161,838 | A | * | 12/2000 | Balsells ....................... 277/511 |
| 6,264,205 | B1 | | 7/2001 | Balsells |
| 6,547,250 | B1 | * | 4/2003 | Noble et al. .................. 277/309 |
| 6,641,141 | B2 | | 11/2003 | Schroeder |
| 7,210,398 | B2 | | 5/2007 | Balsells |
| 7,464,750 | B2 | | 12/2008 | Schapel et al. |
| 8,096,559 | B2 | | 1/2012 | Cook |
| 8,328,202 | B2 | | 12/2012 | Foster et al. |
| 8,544,850 | B2 | | 10/2013 | Balsells et al. |
| 8,684,362 | B2 | | 4/2014 | Balsells et al. |
| 9,194,497 | B2 | | 11/2015 | Rastegar |
| 9,234,591 | B2 | | 1/2016 | Dilmaghanian et al. |
| 9,285,034 | B2 | | 3/2016 | Balsells et al. |
| 9,357,684 | B2 | | 5/2016 | Foster |
| 2002/0153664 | A1 | * | 10/2002 | Schroeder .............. F16J 15/002 |
| | | | | 277/551 |
| 2005/0093246 | A1 | * | 5/2005 | Dietle .................... F16J 15/008 |
| | | | | 277/549 |
| 2006/0066058 | A1 | * | 3/2006 | Holt ...................... F16J 15/166 |
| | | | | 277/584 |
| 2008/0136112 | A1 | | 6/2008 | Addis |
| 2009/0146379 | A1 | * | 6/2009 | Foster ................. F16J 15/3236 |
| | | | | 277/307 |
| 2009/0289418 | A1 | * | 11/2009 | Cook ........................... 277/309 |
| 2010/0052267 | A1 | * | 3/2010 | Castleman et al. ........... 277/551 |
| 2010/0084824 | A1 | * | 4/2010 | Horiba ................. F16J 15/3216 |
| | | | | 277/556 |
| 2010/0237565 | A1 | | 9/2010 | Foster |
| 2011/0006486 | A1 | | 1/2011 | Niknezhad |
| 2011/0140369 | A1 | | 6/2011 | Lenhert |
| 2013/0043661 | A1 | | 2/2013 | Binder et al. |
| 2014/0312570 | A1 | | 10/2014 | Foster |
| 2016/0047473 | A1 | | 2/2016 | Foster et al. |
| 2016/0223086 | A1 | | 8/2016 | Balsells et al. |
| 2017/0172018 | A1 | | 6/2017 | Dilmaghanian et al. |
| 2017/0261108 | A1 | | 9/2017 | Soler et al. |
| 2017/0328474 | A1 | | 11/2017 | Balsells |
| 2018/0112778 | A1 | | 4/2018 | Dilmaghanian et al. |
| 2018/0119857 | A1 | | 5/2018 | Balsells |

FOREIGN PATENT DOCUMENTS

| | | |
|---|---|---|
| JP | H07-10683 U | 2/1995 |
| JP | H07-25311 U | 5/1995 |
| JP | 3052890 U | 7/1998 |
| JP | 2005-83414 A | 3/2005 |
| JP | 2011-179629 A | 9/2011 |
| WO | WO 2010/018364 A1 | 2/2010 |

OTHER PUBLICATIONS

Office Action on related foreign application (JP Application No. 2014-086697) from the Japanese Patent Office dated Sep. 19, 2017.

* cited by examiner

RECIPROCATING SEAL FOR HIGH PULSATING PRESSURE

CROSS-REFERENCE TO RELATED APPLICATION

This is a regular utility application of provisional application No. 61/524,844, filed Aug. 18, 2011, the contents of which are expressly incorporated herein by reference.

FIELD OF ART

Aspects of the present device, system, and method relate to seals for sealing a dynamic surface and a static surface, for example spring energized seal assemblies for reciprocating applications in which a shaft reciprocates back-and-forth.

BACKGROUND

A seal for a reciprocating application is typically used to seal liquid media and designed to be retained between a static surface and a dynamic surface, where the dynamic surface is translated back-and-forth in an axial direction, generating pulsating pressure.

Typical seal applications in which seals make such dynamic contact include reagent dispensing, and syringe pumps generating low to high or ultra high pressure, etc., such as several hundred pounds of pressure to several thousand pounds of pressure. In such applications, seals can deform or extrude due to the pulsating pressure.

Past solutions for such conditions include the use of rectangular and tapered support rings to fit within specialized retaining glands to try to block seal material extrusion. However, past solutions do not always support seal extrusion as well as prevent side-loading to the seal lip in contact with the dynamic surface of the piston.

SUMMARY OF EMBODIMENTS

Aspects of the present device, system, and method include provisions for minimizing gaps between the reciprocating piston or shaft and elsewhere within a sealing box where a seal ring can flow or be pushed due to high system pressure to minimize flowable space for seal material extrusion.

In one example, concave features on the inner and outer edges of support and backup elements or rings are provided to support and hug the preceding element to constrain extrusion.

In another example, multiple contact points on certain elements of the seal assembly are provided to reduce friction against the dynamic surface, such as on the support ring and/or the backup ring.

In still another example, interconnecting axial elements are provided between seal components to minimize separation during installation and use. In some examples, these interconnecting axial elements are support feet without mechanical engagement, such as detents or latches.

In still yet another example, radial centering of the seal assembly along its exterior perimeter is provided to center the assembly relative to the seal holding box. For example, an energizer may be incorporated so that the backup ring or the support ring can also function a bearing.

The device, system, and method are directed to support and reduce seal extrusion under extreme pressure changes due to repeated piston reciprocating movement by incorporating concave features on the inner and outer edges of support and backup ring elements to support and hug the preceding element and constrain extrusion, as well as utilizing multiple contact points on certain elements in order to reduce friction against the dynamic surface. The seal assemblies also include, to reduce damage to seal ID of an off-axis floating rod, a bearing surface on the rod, and multi-points of contact, to reduce friction.

An assembly in accordance with aspects of the present disclosure can comprise at least two components wherein at least one component is a sealing ring and at least one component is a rigid support ring or a backup ring; the at least one of the rigid support ring or the backup ring comprises a concave interface feature and the sealing ring comprises matching a convex surface on an outer face feature to accept, one another when in direct contact with one another.

In an example, the seal assembly comprises both a rigid support ring and a backup ring; and wherein the backup ring comprises a support foot, the rigid support ring comprises a support foot, and the seal ring comprises an inside axial lip extension for contacting a dynamic shaft and an outside radial lip extension for contacting a holding bore.

A more specific feature of the seal assembly can include a groove on the backup ring having an energizer, spring or elastomer disposed therein.

A material selection for the sealing ring or element can include PTFE, polyethylene, PTFE composition, or polyethylene composition.

In embodiments with a spring, the spring can be at least one of a canted coil spring, a ribbon spring, or a V-spring.

In another embodiment, the seal ring comprises an outer flange and an inner flange and a center channel section comprising a width located therebetween and wherein the support ring comprises a width measure from a groove to a surface that contacts the seal ring that is about 90% to about 150% of the width of the center channel section of the seal ring.

A further aspect of the present disclosure is a method for manufacturing a seal assembly. In some embodiments, the method can comprise the steps of providing at least two mating components: wherein at least one component is a sealing ring and at least one component is a rigid support ring or a backup ring. The at least one of the rigid support ring or the backup ring can comprise a concave interface feature and the sealing ring can comprise a matching convex surface on an outer face feature to accept one another. The method can further comprise the step of placing the sealing ring in direct contact with the rigid support ring or the backup ring so that the convex surface on the sealing ring directly contacts the concave interface feature on the rigid support ring or the backup ring.

In some embodiments, the method includes providing both the rigid support ring and the backup ring.

In yet other embodiments, the method includes providing a groove on the backup ring and placing a canted coil spring in the groove.

DETAILED DESCRIPTION

The detailed description set forth below in connection with the appended drawings is intended as a description of the presently preferred embodiments of seal assemblies provided in accordance with aspects of the present device, system, and method and is not intended to represent the only forms in which the present device, system, and method may be constructed or utilized. The description sets forth the features and the steps for constructing and using the seal assemblies of in connection with the illustrated embodiments. It is to be understood, however, that the same or equivalent functions and structures may be accomplished by different embodiments that are also intended to be encompassed within the spirit and scope of the disclosure. As denoted elsewhere herein, like element numbers are intended to indicate like or similar elements or features.

Figure 1:
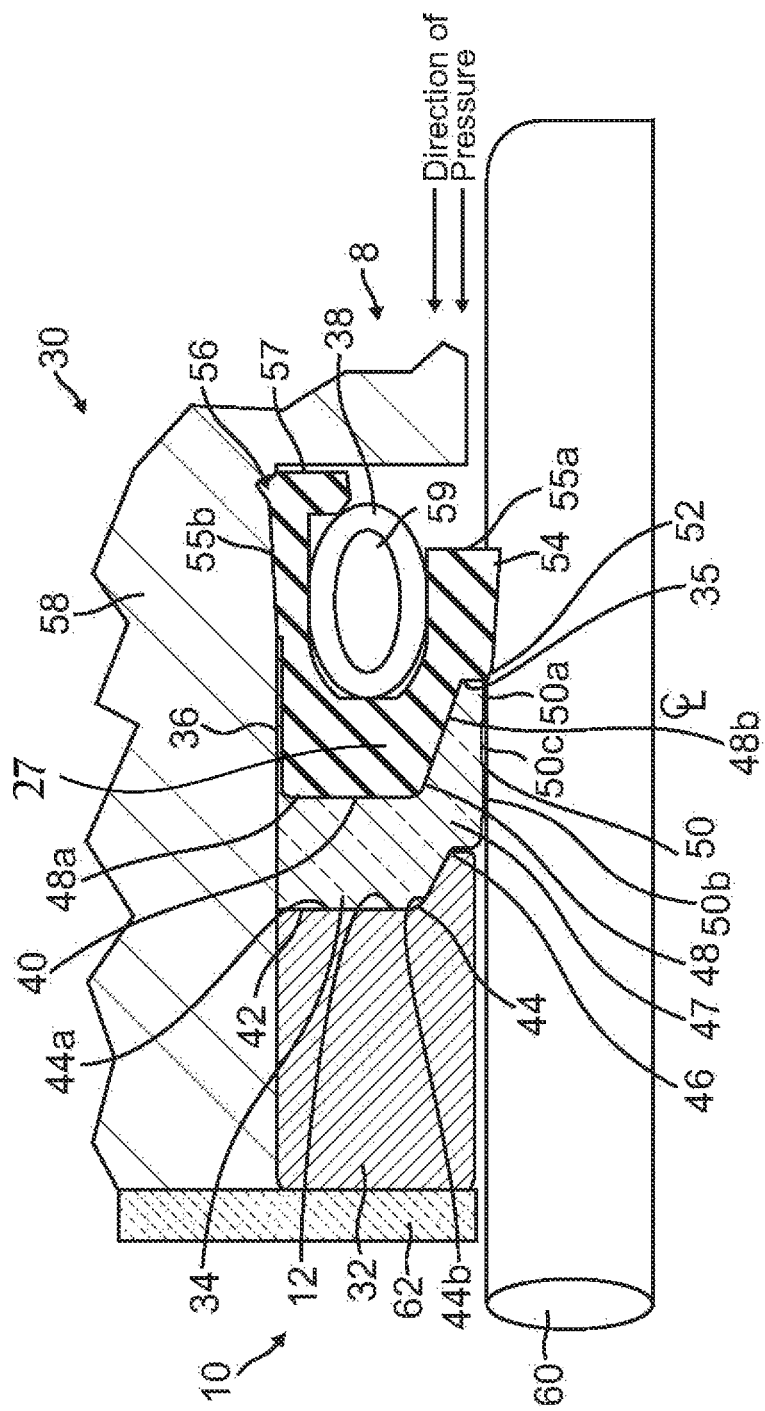
FIG. 1 is a schematic cross-sectional side view of a seal assembly provided in accordance with aspects of the present device, system, and method.

With reference to FIG. 1, a cross-sectional view of a seal assembly 30 provided in accordance with aspects of the present device, system, and method is shown. The seal assembly 30 is understood to be annular in shape with only half of the seal assembly shown from the centerline of the shaft. The seal assembly 30 comprises a number of seal components including a rigid backup ring 32. In one example, the rigid backup ring 32 is made from a high modulus high temperature polymer material, a ferrous, or non-ferrous metal, such as PEEK (polyetheretherketone), PET (polyethylene terephthalate). PEK (polyetherketone), steel or stainless steel. The high modulus material of the backup ring 32 acts as a support for the support ring 34 to reduce material extruding into radial gap(s) under high pressure. In one embodiment, the rigid backup ring is generally rectilinear, i.e., rectangular, with an extended support foot extending towards a seal ring, as further discussed below. In another embodiment, the rigid backup ring is generally rectilinear and without a support foot.

The rigid support ring 34, located next to the rigid backup ring 32, is made from a high modulus high temperature polymer material, a ferrous, or non-ferrous metal. The high modulus material of the support ring 34 supports a rear portion of the seal ring 36 to reduce material extruding into radial gap(s) under high pressure. As used herein, a front, front facing, or front portion is a structure or location that faces or is closest to the pressure region 8 of the seal chamber and the rear, rear facing, or rear portion is a structure or location that is remote from the pressure region, such as closest to the atmospheric region 10. In one embodiment, the support ring is generally rectilinear, i.e., rectangular, with an extended support foot extending towards a seal ring, as further discussed below. Where a support foot is incorporated for the backup ring, a recessed section is provided on the rear facing side of the support ring.

The seal ring 36 has an inner seal flange 55a comprising a seal or sealing lip 54 for sealing against a shaft 60, an outer seal flange 55b comprising a flange lip 57, and a center channel section 27 having a width or thickness measured along the direction of the shaft centerline, and a spring cavity 59 for retaining a spring energizer 38, which exerts a spring force on the seal lip 54 to maintain a sealing force against the shaft 60 and against the outer flange 55b to seal against the interior surface of the gland or seal housing 58, as further discussed below. Use of the spring energizer allows the seal assembly to maintain its seal against the shaft even under low pressure or vacuum where system pressure does not sufficiently force the inner and outer seal flanges 55a, 55b to seal against adjacent surfaces. The seal ring may be made from a PTFE material. In other embodiments, the seal ring may be made from a polyethylene, a PTFE composition, or a polyethylene composition In one example, the inner face (IF) feature 40 of the rigid support ring 34, which is at the interface of the support ring 34 and the seal ring 36 and is inside relative to the atmosphere 10, has a concave geometry to receive the seal ring 36 and supports and reduces seal ring 36 material extrusion under high pressure. The seal ring 36 has a convex corresponding surface feature for mating with the concave geometry of the support ring 34. The interface 40 acts as a net or catcher to capture and retain the seal ring within the confine of the concave surface.

The IF feature 42 of the rigid backup ring 32, which is at the interface of the support ring 34 and the backup ring 32, has a concave geometry that receives the rigid support ring 34 and supports and reduces rigid support ring material extrusion under high pressure. The IF feature 42 of the rigid backup ring 32 supports the outer face (OF) feature 12 of the support ring 34. The concave surface 42, which is concave in the direction of the outside atmosphere 10, may be slightly concave such that the surface is not generally flat, as further discussed below.

In one example, closer to the inside diameter of the rigid backup ring 32, a concave feature 44 is configured to cradle the inside surfaces at the OF feature 12 of the rigid support ring 34 to reduce material extrusion. As shown, the concave surface 44 comprises a generally flat section 44a and a slant section 44b. In one example, the generally flat section 44a and the slant section 44b directly contact the support ring and wherein the flat section 44a has a thickness or width measured in the direction of the shaft centerline that is equal to or greater than the width of the center channel section 27 of the sealing ring 36 to support the sealing ring against extrusion, as further discussed below. In one example, the thickness or width of the backup ring 32 is about 300% or larger than the width of the center channel section 27 of the seal ring 36. The support ring 34 similarly has a thickness measured in the direction of the shaft centerline that is 80% to about 200% larger than the width of the center channel section of the seal ring. The support ring 34 and the seal ring 36 preferably abut or contact one another without any intervening mechanical engagement therebetween, such as detents or latches. This allows the two components to freely float as they experience pressure exerted by the system and not be hung up or trapped due to the detents or latches.

A support foot 46 is provided on the backup ring 32 to support a recessed section 47 on the OF feature 12 of the rigid support ring 34. The support foot 46 is provided at the IF feature 42 of the rigid backup ring 32 to reduce material extrusion on the support ring 34, which reduces material extrusion on the seal ring 36, from contacting the shaft. For example, the support foot 46 provides support for sections or parts of the support ring 34 that may tend to bulge or deflect, such as extrude, due to the high pressure and/or the reciprocating shaft 60. As shown, the support foot 46 engages a recessed section 47 of the support ring.

In one example, the interface feature 40 of the support ring 42 comprises a concave feature 48 for cradling the outer face feature of the seal ring 36 to reduce seal ring material extrusion. In one exemplary embodiment, the concave feature 48 is a bend formed on the IF feature 40 of the rigid support ring 34. As shown, the concave feature 48 comprises a generally flat section 48a and a slant section 48b. The rigid support ring 34 extends beyond the bend near the concave feature 48 to define a support foot 52 for supporting a recess section 35 of the seal ring 36. Thus, an aspect of the present embodiment is a seal assembly comprising a seal ring, a support ring, and a backup ring, and wherein a support foot on the support ring projects into a recessed section on the seal ring and a support foot on the backup ring projects into a recessed section on the support ring. Preferably, the contacts between the three components are direct and within any detents or latches in between so that they are free to move or rotate to conform to the force or system pressure.

In one example, the support foot 52 on the rigid support ring 34 is provided with multi-point contacts 50 within the inside diameter (ID) of the rigid support ring 34 to reduce drag and to provide a bearing surface to guide the rod or shaft 60. The multi-point contact 50 on the support foot 52 may be formed by providing a recessed section 50c to create anon-contact region between two contact points 50a, 50b. Thus, two contact points are spaced about a non-contact point or region 50c. There may be more than one multi-point contacts and on both the support ring and the backup ring. In other examples, multiple recessed sections are provided between contact sections to create multiple contact regions. The configuration of the support foot 52 provides support for the seal ring 36 and reduces material contacting the shaft, such as by providing recessed sections between contact sections to provide multi-point contacts instead of a single line contact. The support foot 52 having multi-point contacts reduces friction compared to a support foot with a line contact without a recess. The support foot is also understood to provide support for the seal ring 36 against unwanted extrusion.

In one embodiment, the support foot 52 on the rigid support ring 34 extends further radially inwardly towards the axis of the shaft or rod 60 than the support foot 46 on the backing ring 32. In other words, the support foot 52 on the support ring is longer in the axial direction than the support foot 46 on the backup ring. The support foot 52 on the support ring also incorporates at least one multi-point contact 50 to minimize flowable gap or space. This configuration is provided so that any gap between the shaft 60 and the seal assembly is minimized or reduced by the support foot 52 to thereby support the seal ring 36 from unwanted extrusion through the gap(s) caused by the system pressure. Conversely, a relatively small gap 53 may be provided between the backup ring 32 and the shaft since this is less material extrusion from the support ring 42.

As previously discussed, a contact zone 54 is provided at the ID of the seal ring 36 to provide a seal against the movable surface of the rod 60 of shaft. At the outside diameter (OD) or outside flange 55b of the seal ring 36, a contact zone 56 is provided to form a seal against the inner surface of the gland 58. The biasing element or spring energizer 38, such as a canted coil spring, is configured to exert an outwardly directed force to push the outside flange 55b into sealing contact with the inner surface of the gland and to push the inside flange 55a into sealing contact with the shaft. A gland plate or flange 62 is provided to secure against the gland 58 to retain the sealing system or assembly 30 within the seal space. The gland plate 62 facilitates installation of the seal assembly within the seal box or seal housing 58.

As described, the seal assembly 30 is understood to include a first support foot 52 that projects inwardly towards a seal ring 36 and a second support foot 46 that also projects inwardly towards the seal ring to provide axial alignment between different components of the seal assembly. In one example, the first support foot 52 is located on a rigid support ring 34 and the second support foot 46 is located in a rigid backup ring 32. In the embodiment shown, the second support foot 52 projects axially under the support ring 34 and the first support foot 52 projects axially under the seal ring 36. In some embodiments, one or more grooves along the OD of the backing ring 32, support ring 34 or both are incorporated for accommodating a corresponding number of O-rings to further seal the seal assembly against the gland. Engagement detents or other surface features may be incorporated for the various seal assembly components to prevent relative rotation and axial separation during assembly or while in service but less preferred.

The present seal assembly is further understood to include a seal ring 36 comprising an outer flange 55a, an inner flange 55b comprising a seal lip 54, and a recessed section 35 on an outer surface. The present seal assembly further includes a support ring 34 comprising an interface feature 40 comprising a concave feature 48 comprising a generally flat section 48a and a slant section 48b defining a bend therebetween. The slant section forming a support foot 52 and projecting into the recessed section 35 of the seal ring to support the inner flange 55a of the seal ring from extrusion due to high operating seal box pressure. In one example, the slant section 48b has a thickness at a widest point that is equal to or greater than the thickness of the inside flange to provide support for the inside flange against extrusion. At its narrowest point, the slant section 48b has a thickness of about 25% to about 55% of the thickness of the seal lip 54 to provide support for the inside flange 55a against extrusion.

The present seal assembly further includes a backup ring 32 positioned adjacent the support ring 34. The backup ring 32 comprising an interface feature 42 comprising a concave feature 44 comprising a generally flat section 44a and a slant section 44b defining a bend therebetween. The slant section 44b forming a support foot 46 and projecting into the recessed section 47 of the support ring 34 to support the slant section 48b of the support ring 34 from extrusion due to high operating seal box pressure. In one example, slant section 44b of the backup ring 32 has a thickness at a widest point that is equal to or greater than the thickness of the inside flange 55a of the seal ring to provide support for the slant section 48b against extrusion. At its narrowest point, the slant section 44b of the backup ring has a thickness of about 25% to about 55% of the thickness of the seal lip 54 to provide support for the slant section 48a of the support ring against extrusion. As shown, the length of the slant section 44b of the backup ring 32 in the axial direction is about 20% to about 60% of the length of the slant section 48b of the support ring 42. The shorter length slant section 44b of the backup ring 32 is incorporated since the structure that it supports, i.e. the support ring 34, is made from a substantially more rigid material than the seal ring 36, which means it is less susceptible to extrusion than the seal ring. In one example, the support ring is made from a high modulus high temperature polymer material, such as PEEK (polyetheretherketone), PET (polyethylene terephthalate), PEK (polyetherketone), while the backup ring is made from a metal, such as from steel or stainless steel. In another example, the backup ring 32 and the support ring 34 are both made from a high modulus high temperature polymer material. In yet another example, the backup ring 32 and the support ring 34 are both made from a metal material.

As further discussed below with reference to FIG. 5, high pressure in the sealing box creates tangential forces against every surfaces of the seal ring 36, which causes the seal ring to expand outwardly in all directions along the two seal flanges 55a, 55b and axially against the center channel section 27, in the direction of the atmosphere 10. These forces cause the seal 36 to extrude outwardly in the direction of the support ring 34 and radially against the slant section 48b and support foot 52 of the support ring 34. If these forces are relatively high, they can cause the support foot 52 to slightly distort and abut against the shaft 60. However, as the support foot 52 incorporates a recessed section 50c, friction is reduced when the shaft and the support foot frictionally drag and slide against one another. Pressure acting on the sealing ring 36 not only pushes against the support ring 34 but also against the back up ring 32. In an alternative embodiment, the support foot 46 on the backup ring 32 may incorporate a multi-point contact surface, similar to the contacts 50a, 50b on the support ring 34. The backup ring 32 may also incorporate a groove along its exterior surface with a biasing element, such as a canted coil spring, to also function as a bearing, as further discussed below with reference to FIG. 2.

Figure 2:
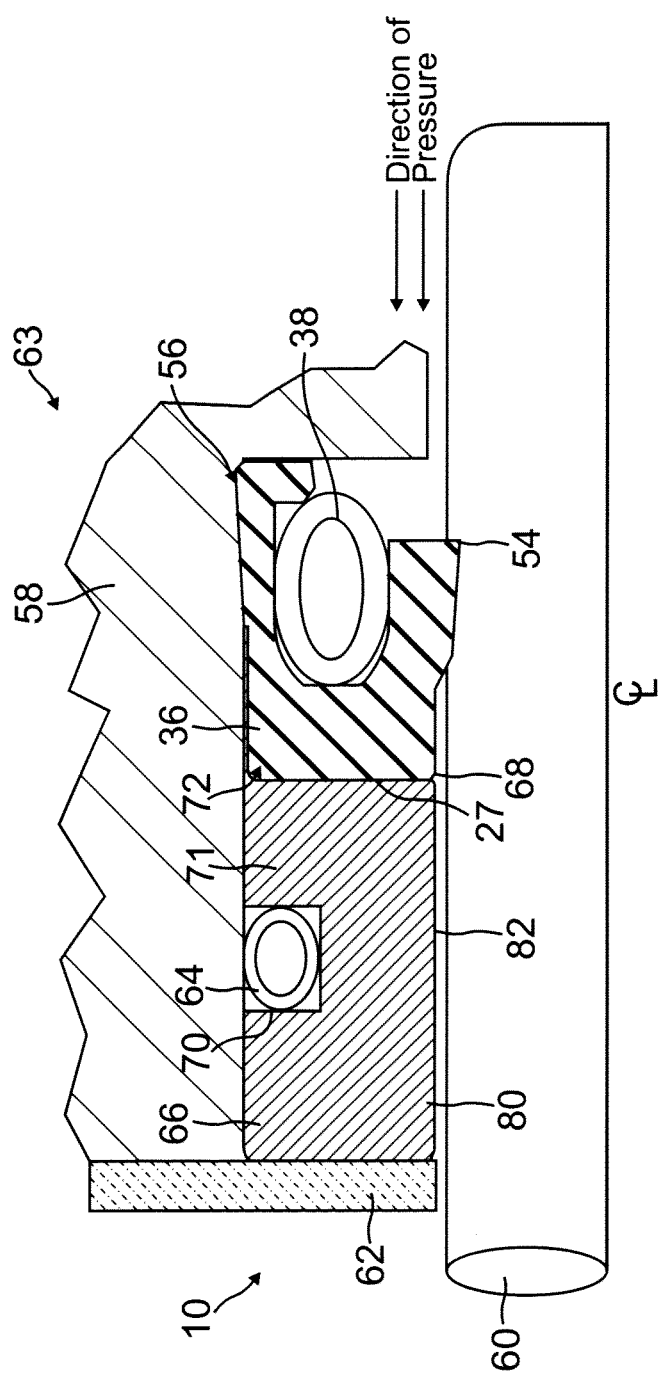
FIG. 2 is a schematic cross-sectional side view of an alternative seal assembly provided in accordance with aspects of the present device, system, and method.

FIG. 2 is a schematic cross-sectional side view of an alternative seal assembly, which is generally designated 63. The seal assembly 63 is similar to the seal assembly 30 of FIG. 1, such as including a similar seal ring 36 and a similar spring energizer 38, with a few exceptions. In the present embodiment, the support ring is eliminated in favor of an extended or enlarged rigid backup ring 66, which is much longer lengthwise than the backup ring 32 of FIG. 1. Alternatively viewed, the present embodiment has a single support ring 66 and no backup ring. Thus, while the discussions that follow call out a backup ring, it may alternatively be referred to as a single support ring without a backup ring.

A spring groove 70 comprising a channel spaced from the sealing element 36 is incorporated on the outside diameter of the backup ring 66 for accommodating a biasing element 64, such as a radial canted coil spring 64. The spring groove 70 is shown with two sidewalls and a bottom wall located therebetween. In other embodiments, an elastomer may be used, such as an O-ring or a spring embedded O-ring. Alternatively, a ribbon spring or a V-spring may be used instead of a canted coil spring. The biasing element 64, such as a spring or an elastomer, is configured to center the rigid backup ring 66 with respect to the gland or seal box 58. Thus, the present rigid backup ring 66 is understood to be dynamically centered relative to the gland 58, due to the biasing function of the spring or other biasing feature 64.

From time-to-time, such as during a surge in the system, due to vibration, due to misalignment, etc., the shaft 60 may move up-and-down in the direction orthogonal to the shaft centerline. When this occurs, the shaft 60 can physically move against the annular interior surface 80 of the backup ring 66 and occupies the gap 82 shown in FIG. 2. However, since the backup ring 66 has a biasing element 64, the backup ring biases or absorbs the shaft's radial deflection, like a bearing. Thus, the backup ring 66 in the present embodiment not only supports the seal ring from high pressure extrusion, it also functions as a bearing to support the shaft. In another embodiment, the backup ring 66 incorporates one or more multi-point contacts similar to contact points 50a, 50b in FIG. 1 along its interior annular surface 80 to reduce friction when in contact with the shaft 60. In yet another embodiment, two or more grooves with two or more biasing elements may be used instead of a single groove 70 and a single biasing element 64.

In one example, the rigid backup ring 66 is made from a high modulus high temperature polymer material, a ferrous, or non-ferrous metal. The high modulus material supports the rear portion of seal ring 36 to reduce material extrusion into radial gaps under high pressure. Although not shown, an optional support foot may be incorporated along the IF feature 72 of the backup ring to support the ID of the seal ring, similar to the embodiment of FIG. 1. Still furthermore the support foot may incorporate one or more multi-point contacts to reduce friction when in contact against the moving shaft 60.

In one example, the rigid backup ring 66 incorporates a concave geometry 68 near its ID and along the IF feature to receive and support the seal ring and biasing element, which has opposite but corresponding geometry. Because of its high modulus characteristics, the backup ring 66 supports and reduces seal ring 36 material extrusion under high pressure.

In one embodiment, the IF feature 72 of rigid backup ring 66 is a concave geometry that receives the seal ring and spring energizer for support and reduce seal ring 36 material extrusion under high pressure. Preferably, the IF feature directly contacts the sealing ring 36 without any intervening detents or latches therebetween. This allows the two components 36, 66 to float freely without being hung up or caught up by the detents when exerted by system pressure. As shown, the width or thickness 71 of the backup ring 66 that directly contacts the sealing ring 36 measured from an edge of the groove 70 to the contact interface is about 80% to about 200% of the width of the center channel section 27 of the sealing ring 36. This direct contact with the sealing ring 36 and thickness without any intervening detents or latches are configured to prevent unwanted sealing ring extrusion due to high to very high system pressure.

Thus, an aspect of the present embodiment is understood to include a seal assembly comprising a dual purpose backup ring, which supports a seal ring from material extrusion and functions as a bearing to support shaft deflection. In a particular embodiment, the backup ring comprises a groove formed along its outside diameter (OD) and has a biasing element located therein. The interface between the backup ring and the seal ring may be generally flat, may be curved, may be concave, and may have a combination of a flat surface and a slant surface. The present embodiment is further understood to include a locking ring (See, e.g., FIG. 4) a second canted coil spring located in a cavity defined by the seal ring. In yet another embodiment, the contact between the seal ring and the backup ring is without any intervening detent or latch to enable movement without hindrance typically found in devices with detents or latches. To support the seal ring against material extrusion, the surface that directly contacts the center channel section of the seal ring has a thickness of about 80% to 200% or greater than the width of the center channel section. The thickness is measured from the point of contact to an edge of the groove for retaining the biasing element.

Figure 3:
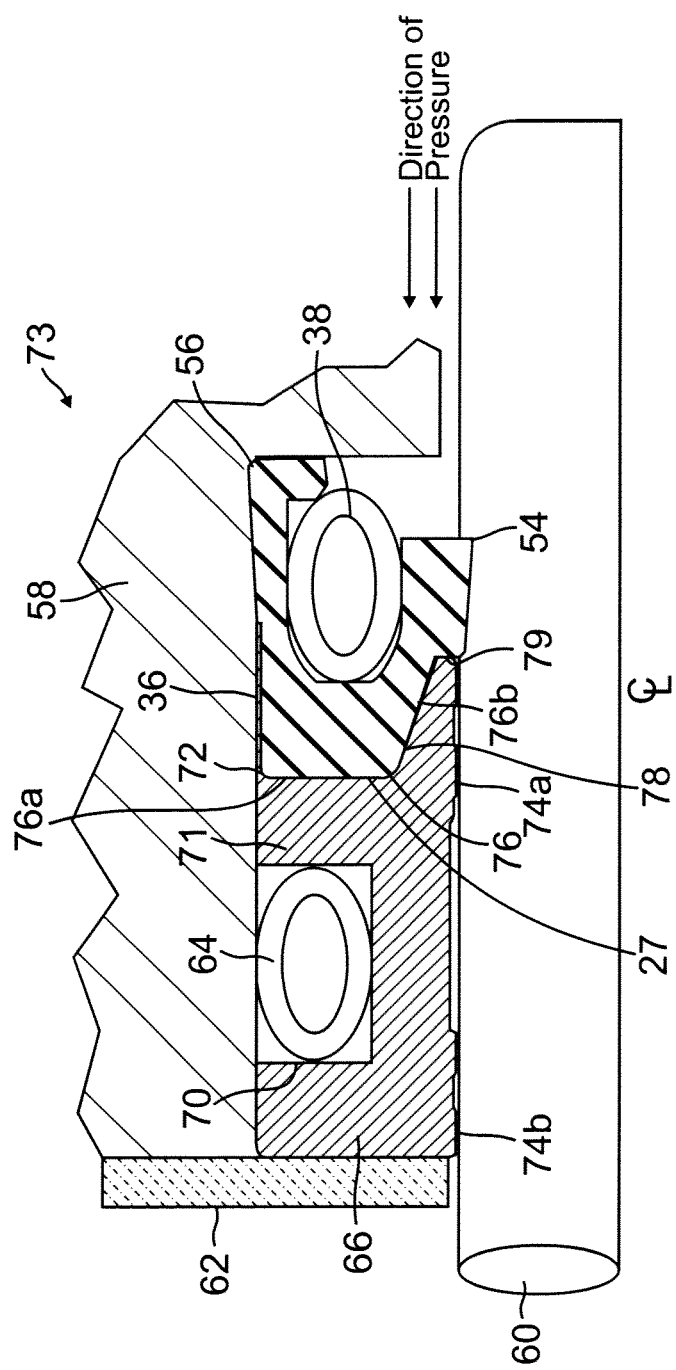
FIG. 3 is a schematic cross-sectional side view of another alternative seal assembly provided in accordance with aspects of the present device, system, and method.

With reference now to FIG. 3, a schematic cross-sectional side view of an alternative seal assembly is shown, which is generally designated 73. The seal assembly 73 is similar to the seal assembly 63 of FIG. 2, such as incorporating a similar sealing ring 36 and a backup ring 66, with a few exceptions. In the present embodiment, the rigid support ring 66 incorporates an inner bearing 74a and an outer bearing 74b having multi-contact surfaces. The inner and outer bearings 74a, 74b stabilize the seal assembly against the shaft 60 and provide added reducers to minimize gaps, which act as pathways for unwanted material extrusion. Thus, aspects of the present seal assembly is understood to include a rigid backup ring 66 having a biasing element 64 for centering the seal assembly against the gland and two spaced apart bearing surfaces, for stabilizing and preventing seal material extrusion, and for supporting shaft movement. In other embodiments, there three or more bearings having multi-point contacts are provided.

In one example, the rigid backup ring 66 is provided with a concave feature 76 for cradling the seal ring 36 to thereby reduce material extrusion. A support foot 78 extends axially of the concave feature 76 to support the seal ring's ID, to reduce unwanted material contact with the rod 60. The concave feature 76 includes a generally flat section 76a and a slant section 76b, similar to corresponding features in FIG. 1 for supporting a recessed section 79 of the sealing ring 36.

As shown, the IF feature 72 directly contacts the sealing ring 36 without any intervening detents or latches therebetween to permit free floating between the two components, as previously discussed. The width or thickness 71 of the backup ring 66 that directly contacts the sealing ring 36 measured from an edge of the groove 70 and the contact interface is about 80% to about 150% of the width of the center channel section 27 of the sealing ring 36. This direct contact with the sealing ring 36 and thickness without any intervening detents or latches are configured to prevent unwanted sealing ring extrusion due to high to very high system pressure.

Figure 4:
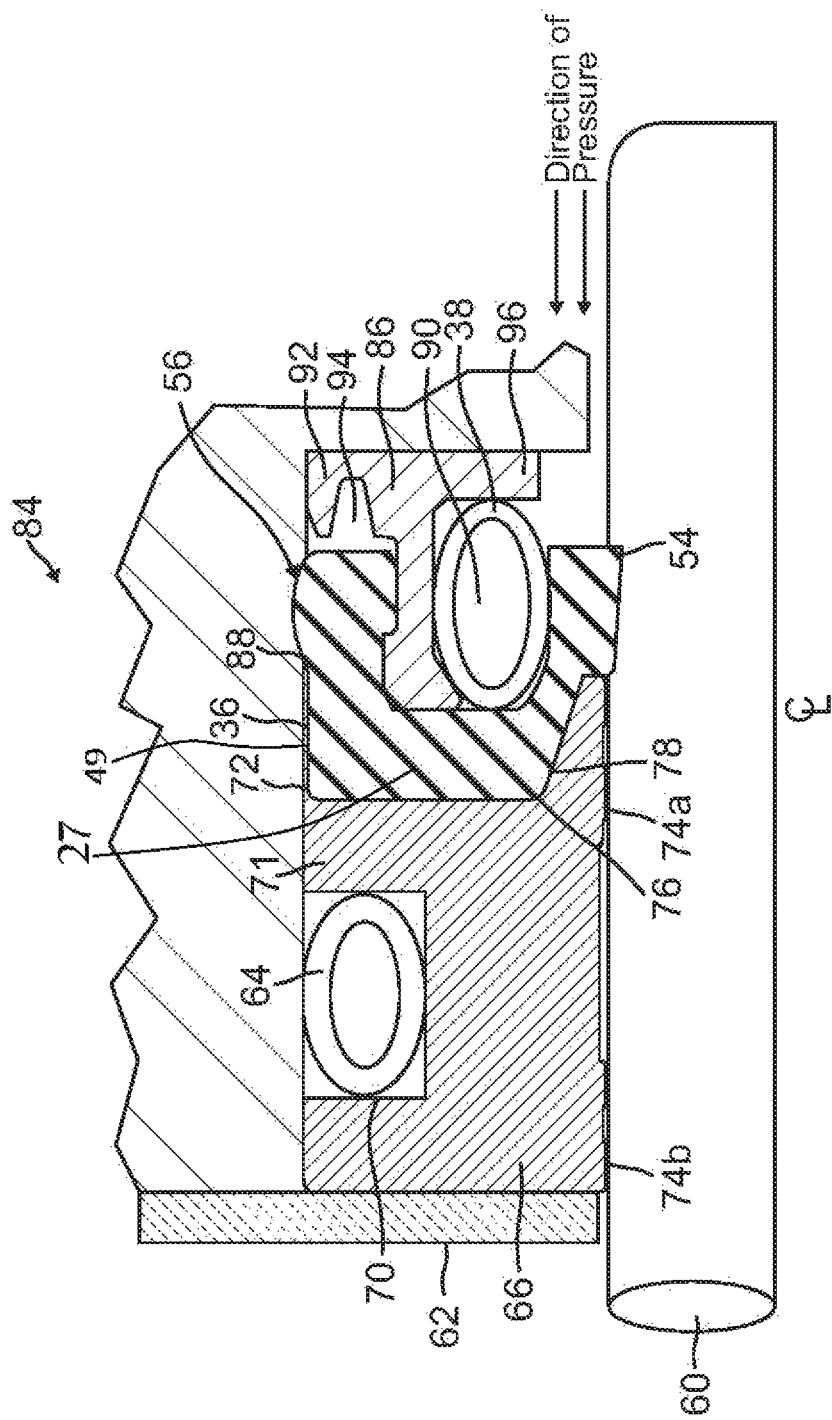
FIG. 4 is a schematic cross-sectional side view of yet another alternative seal assembly provided in accordance with aspects of the present device, system, and method.

With reference now to FIG. 4, a schematic cross-sectional side view of an alternative seal assembly is shown, which is generally designated 84. The seal assembly 84 is similar to the seal assembly 63 of FIG. 2 and the seal assembly 73 of FIG. 3, such as incorporating a similar sealing ring 36 and a backup ring 66, with a few exceptions. In the present embodiment, the sealing ring 36 has been modified to have a shortened exterior seal flange 88 for accepting a locking ring 86. Exteriorly, the seal flange 88 has an outer edge 49 that is generally the same as the outer edge of the outer diameter of the center channel section 27 of the sealing ring 36. The locking ring engages the exterior seal flange 88 and together with the locking ring 86 define a cavity 90 for receiving a canted coil spring 38. The locking ring 86 further has a tab 92 and a cut-out 94 for forming a cantilevered section to engage against the interior surface of the sealing box. The locking ring 86 further has a ring lip 96 for capturing the canted coil spring 38 within the cavity 90.

Like the embodiment of FIG. 3, the rigid support ring 66 incorporates an inner bearing 74a and an outer bearing 74b having multi-contact surfaces. The inner and outer bearings 74a, 74b stabilize the seal assembly against the shaft 60 and provide added reducers to minimize gaps, which act as pathways for unwanted material extrusion. The terminal end along the outside diameter of the rigid support ring extends along at least a portion of an outer edge along an outer diameter of the seal ring. Thus, aspects of the present seal assembly is understood to include a rigid backup ring 66 having a biasing element 64 for centering the seal assembly against the gland and two spaced apart bearing surfaces, for stabilizing and preventing seal material extrusion, and for supporting shaft movement. In other embodiments, more than three bearing surfaces are incorporated. In still other embodiments, two or more grooves with two or more biasing elements are incorporated instead of just one of each as shown.

As shown, the IF feature 72 directly contacts the sealing ring 36 without any intervening detents or latches therebetween to permit free floating between the two components, as previously discussed. The width or thickness 71 of the backup ring 66 directly contacts the sealing ring 36 measured from an edge of the groove 70 and the contact interface is about 80% to about 150% of the width of the center channel section 27 of the sealing ring 36. This direct contact with the sealing ring 36 and thickness without any intervening detents or latches are configured to prevent unwanted sealing ring extrusion due to high to very high system pressure.

Figure 5:
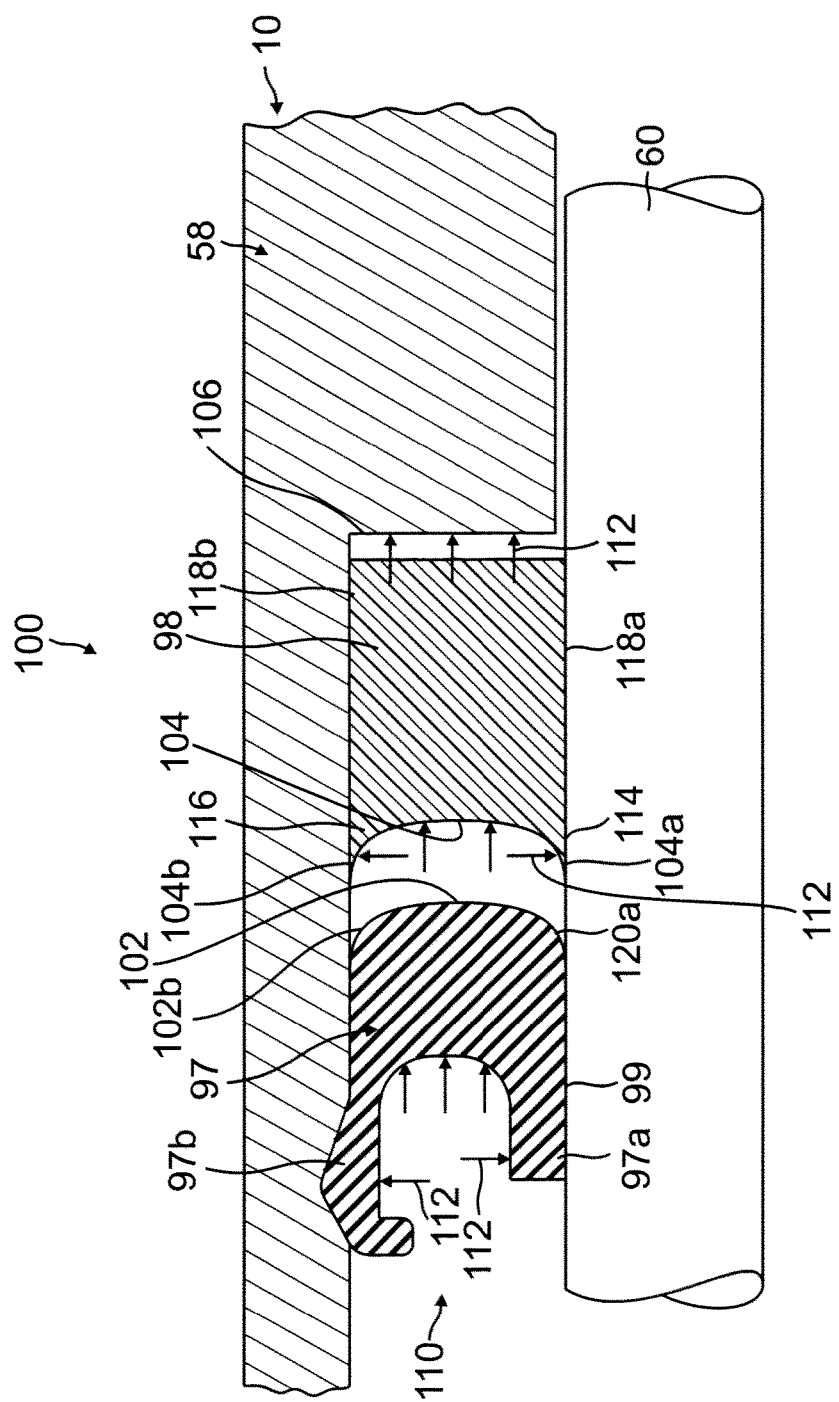
FIG. 5 is a schematic cross-sectional side view of still yet another alternative seal assembly provided in accordance with aspects of the present device, system, and method.

With reference now to FIG. 5, a schematic cross-sectional side view of an alternative seal assembly is shown, which is generally designated 100. The seal assembly 84 comprises a sealing ring 97 comprising an inner seal flange 97a and an outer seal flange 97b defining a cavity for optionally receiving a canted coil spring (not shown). The sealing ring 97 is shown with an elongated line contact 99 against the shaft 60. In an alternative embodiment, a recessed or raised section may be incorporated to shorten the line contact, similar to that show in FIGS. 1-4.

The sealing ring 97 is shown spaced from a backup ring 98 for purposes of discussions only. In practice, the sealing ring 97 is abutted against the backup ring 98 and the two corresponding curved surfaces 102, 104 mate. The concave feature 104 of the backup ring 98 has two similar terminal ends 104a, 104b that are shaped into pointed ends for fitting into corresponding shaped ends 120a, 120b on the sealing ring 97. The backup ring 98 is also shown spaced from aback wall 106 of the seal housing 58 for discussion purposes only. In practice the outer surface 108 of the backup ring 98 is pushed into mating contact with the back wall 106 on that system pressure from the high pressure region 110 does not cause the various seal components to move during service.

In the present embodiment, the concave shaped surface 102 of the seal ring and matching curvature 104 on the backup ring allow the two to come together and touch upon application of pressure. During the application of pressure, such as during service, the pressure 112 applied on the seal 97 will be transmitted to the backup ring 98 in all directions, which means that the applied pressure will be applied radially towards the ID and OD of the seal and axially along the back portion of the concave part 104 of the backup ring 98.

By applying pressure on the concave portion 104 of the backup ring 98 in a radial manner, it contributes to bringing the backup ring ID and OD in contact with the mating surface of the shaft 60 and housing 58 to eliminate any possible gap that may occur between the ID of the backup ring to form a seal 114 against the shaft 60 and the OD of the backup ring to form a seal 116 against the ID of the housing 58 so as to prevent extrusion of the seal ring 97 under all conditions of pressure.

The ability to seal against the shaft 60 and the housing 58 with the support ring 98 is highly advantageous in high to very high pressure applications, in particular, in pulsating high pressure applications where extrusion of the seal ring 97 is a high possibility. By providing the backup ring 98 with the concave portion 104, the design uses system pressure to force the outer 116 and inner 114 diameter of the backup ring 98 into intimate contact with the housing 58 and the shaft 60, respectively, to prevent or minimize material extrusion of the seal ring through the gaps 118a, 118b that are normally present with prior art designs.

By mating the seal ring 97 with the backup ring 98 in the manner described, extrusion of the seal ring under conditions of high pressure is minimized or eliminated thus preventing the deformation of the seal assembly 100 and stabilizing the cross section of the seal ring 97. This concept is also disclosed and shown with reference to FIGS. 1, 3, and 4 and optionally incorporated with the assembly of FIG. 2.

As disclosed, the present assemblies, such as the assemblies 30, 63, 73, 84 of FIGS. 1-4, are understood to optionally include similar concave surfaces 102, 104 as that shown with reference to FIG. 5. The mating concave surfaces 102, 104 are configured to form sealing contacts 114, 116 against adjacent surfaces, such as against the shaft and the seal housing respectively, when under high to very high pressure applications. The seal assembly 100 of FIG. 5 may also include a locking ring, a canted coil spring inside a seal ring cavity, a groove with a biasing element, and bearing surfaces, similar to other embodiments discussed elsewhere herein.

Figure 6:
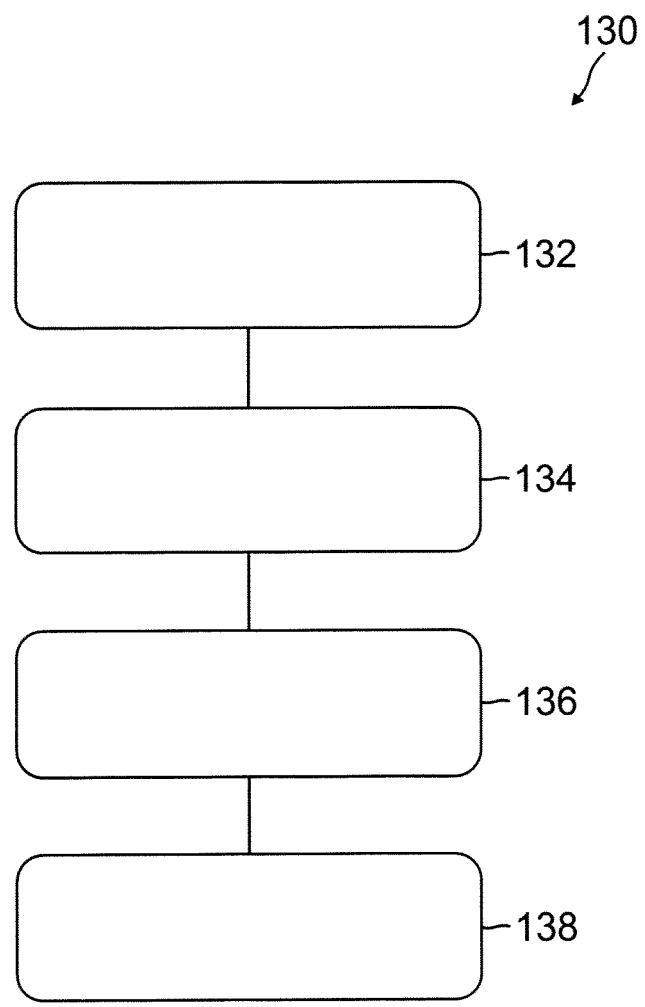
FIG. 6 is a schematic process flow diagram depicting a method for manufacturing or for using a seal assembly provided in accordance with aspects of the present disclosure.

FIG. 6 is a process flow diagram depicting an exemplary method of the present disclosure. In one example, the method 130 depicts steps for manufacturing a seal assembly of the present disclosure. In another example, the method 130 depicts steps for using a seal assembly of the present disclosure to seal against a moving shaft. As shown, the method comprises a step 132 for forming a sealing ring comprising an inner flange having a sealing lip and an outer flange having a sealing surface for sealing against a sealing box. The method further includes an optional step of placing a biasing element, such as a canted coil spring in a seal cavity defined by the inner and outer sealing flanges.

At 134, the method comprises the step of placing a support ring in adjacent contact with the sealing ring without detents or latches therebetween to permit free floating between the support ring and the sealing ring.

At 136, the method comprises the step of placing a backup ring in adjacent contact with the support ring without detents or latches therebetween to permit free floating between the support ring and the backup ring.

At 138, the method comprises placing a locking ring in engagement with the sealing and adjusting the biasing element so that it is located in a cavity defined by the combination sealing ring and locking ring. Alternatively, the locking ring may be installed before placing a biasing element in a seal ring cavity.

In an alternative embodiment, the method comprises the steps for forming the seal assembly of 30 of FIG. 1, without a locking ring.

In another embodiment, the method comprises the steps for forming the seal assembly 63 of FIG. 2.

In another embodiment, the method comprises the steps for forming the seal assembly 73 of FIG. 3.

In another embodiment, the method comprises the steps for forming the seal assembly 84 of FIG. 4.

In another embodiment, the method comprises the steps for forming the seal assembly 100 of FIG. 5.

Although limited embodiments of seal assemblies and their components have been specifically described and illustrated herein, many modifications and variations will be apparent to those skilled in the art. For example, a different combination of pliable seal ring plastic material and rigid plastic housing structure may be used instead of PTFE and PEEK. Furthermore, it is understood and contemplated that features specifically discussed for one seal embodiment may be adopted for inclusion with another seal embodiment, provided the functions are compatible. For example, although a locking ring 86 is only shown with reference to FIG. 4, it may be incorporated and used with any of the embodiments of FIGS. 1-3 and 5. The present device and system further include methods for forming the seal assemblies as described. Accordingly, it is to be understood that the seal assemblies and their components constructed according to principles of this disclosure may be embodied other than as specifically described herein. The device, system, and method are also defined in the following claims.

What is claimed is:

1. A seal assembly comprising:
   a rigid support ring or a backup ring comprising a terminal end portion along an inside diameter and a terminal end portion along an outside diameter, a concave interface surface, a bore defined by the inside diameter, and a most concave part of the concave interface surface defining a plane orthogonal to an axis passing through the inside diameter;
   a seal ring comprising a convex surface on an outer face matching the concave interface surface, a center channel section, an inner flange having a sealing lip, and an outer flange; and said seal ring comprising a recessed section formed at the outer flange at a location proximate an inner surface of a gland against which part of the outside flange of the seal ring seals when the seal assembly is located in the gland;
   a spring cavity defined by the center channel section, the inner flange, and the outer flange of the seal ring;
   a canted coil spring comprising a plurality of interconnected canted coils located in the spring cavity of the seal ring and being in contact with the inner flange of the seal ring biasing both the inner flange of the seal ring and the outer flange of the seal ring away from one another;
   wherein the convex surface of the seal ring is in direct abutting contact with the concave interface surface without mechanical inter-engagement and wherein the terminal end portion along the outside diameter of the rigid support ring or backup ring extends away from the plane defined by the most concave part of the concave interface surface and along a corresponding portion of a first outer edge of the seal ring proximate the outer flange and the recessed section of the outer flange, and the terminal end portion along the inside diameter of the rigid support ring or backup ring extends away from the plane defined by the most concave part of the concave interface surface and along a corresponding portion of a second outer edge of the seal ring proximate the inner flange.

2. The seal assembly according to claim 1, comprising both the rigid support ring and the backup ring; and wherein the backup ring comprises a support foot, the rigid support ring comprises a support foot, and the seal ring comprises an inside axial lip extension for contacting a dynamic shaft and an outside radial lip extension for contacting a holding bore.

3. The seal assembly of claim 1, wherein the seal ring is made from a polymer material.

4. The seal assembly of claim 3, wherein the seal ring is made from a PTFE, a polyethylene, a PTFE composition, or a polyethylene composition.

5. The seal assembly of claim 1, wherein the rigid support ring is made from a high modulus high temperature polymer material, a ferrous material, or a non-ferrous metal.

6. The seal assembly of claim 1 wherein the backup ring is made from a high modulus high temperature polymer material, a ferrous material, or a non-ferrous metal.

7. The seal assembly of claim 1, wherein the canted coil spring is a radial canted coil spring.

8. The seal assembly of claim 1, wherein the rigid support ring has a support foot with multi-point contacts defined by a recessed section between the multi-point contacts, the multi-point contacts providing a barrier surface to guide the shaft.

9. The seal assembly of claim 1, comprising both the backup ring and the rigid support ring and wherein the backup ring has a concave support surface and is in direct contact with a convex outer surface of the rigid support ring.

10. The seal assembly of claim 1, further comprising a locking ring in abutting contact with the outer flange of the seal ring and directly urged by the canted coil spring.

11. The seal assembly of claim 10, further comprising a groove on the rigid support ring or the backup ring having a canted coil spring located therein and wherein the groove comprises two sidewalls and a bottom wall located therebetween.

12. The seal assembly of claim 1, wherein the outside diameter of the rigid support ring or the backup ring extends radially outside at least a portion of the outer flange of the seal ring.

13. The seal assembly of claim 1, further comprising a groove on the rigid support ring or the backup ring having a canted coil spring located therein and wherein the groove comprises two sidewalls and a bottom wall located therebetween.

14. The seal assembly of claim 13, wherein the canted coil spring in the groove is spaced from the seal ring.

15. A method for manufacturing a seal assembly comprising:
providing at least two mating components:
wherein at least one component is a seal ring comprising an inner flange, an outer flange, and a center channel section defining a cavity and at least one component is a rigid support ring or a backup ring, and wherein a recessed section is formed at the outer flange at a location proximate an inner surface of a gland against which part of the outside flange of the seal ring seals when the seal assembly is located in the gland;
the at least one of the rigid support ring or the backup ring comprises a terminal end portion along an inside diameter and a terminal end portion along an outside diameter, a concave interface surface, a bore defined by the inside diameter, and a most concave part of the concave interface surface defining a plane orthogonal to an axis passing through the inside diameter; and
the seal ring comprises a convex surface to accept the concave interface surface; and
placing the seal ring in direct contact with the rigid support ring or the backup ring so that the convex surface on the seal ring directly contacts the concave interface surface on the rigid support ring or the backup ring; and
wherein a canted coil spring comprising a plurality of interconnected canted coils is disposed in the cavity and biasing both the inner flange of the seal ring and the outer flange of the seal ring away from one another and the groove is spaced from the seal ring; and
wherein the convex surface of the seal ring is in direct abutting contact with the concave interface surface without mechanical inter-engagement and wherein the terminal end portion along the outside diameter of the rigid support ring or backup ring extends away from the plane defined by the most concave part of the concave interface surface and along a corresponding portion of a first outer edge of the seal ring proximate the outer flange and the recessed section of the outer flange, and the terminal end portion along the inside diameter of the rigid support ring or backup ring extends away from the plane defined by the most concave part of the concave interface surface and along a corresponding portion of a second outer edge of the seal ring proximate the inner flange.

16. The method for manufacturing of claim 15, further comprising:
providing both the rigid support ring and the backup ring.

17. The method for manufacturing of claim 15, wherein the rigid support ring or the backup ring has a groove having an energizer disposed therein to center the rigid support ring or the backup ring when located in a gland.

18. The method for manufacturing of claim 15, further comprising providing a support foot on the rigid support ring or the backup ring and locating the support foot under the seal ring.

19. A seal assembly comprising:
a rigid support ring or a backup ring comprising a first interface surface, a second interface surface, a terminal end portion along an inside diameter and a terminal end portion along an outside diameter;
a seal ring comprising an interface feature, a center channel section, an inside flange, and an outside flange defining a spring cavity having a canted coil spring located therein biasing the inside flange of the seal ring and the outside flange of the seal ring away from one another, said seal ring further comprising a recessed section formed between the inside flange of the seal ring and a shaft against which a sealing lip of the inside flange of the seal ring seals and a recessed section formed at the outer flange at a location proximate an inner surface of a gland against which part of the outside flange of the seal ring seals;
a support foot on the rigid support ring or backup ring extending into the recessed section, the support foot comprising an inner bearing comprising multi-point contacts defined by a recess;
wherein the interface feature of the seal ring directly contacts the first interface surface of the rigid support ring or the backup ring without mechanical inter-engagement, and wherein the terminal end portion along the outside diameter of the rigid support ring or the backup ring extends along a corresponding portion of the seal ring proximate the outer flange and the recessed section of the outer flange; and
wherein a slant section of the support foot projects into the recessed section of the seal ring to support the inside flange from extrusion by operating seal box pressure.

20. The seal assembly of claim 19, comprising both the backup ring and the support ring; wherein the second interface surface directly contacts an inner support surface of the backup ring.

21. The seal assembly of claim 19, further comprising a locking ring in contact with the outer flange and the gland, and directly biased by the canted coil spring.

22. The seal assembly of claim 19, further comprising a groove on the rigid support ring or the backup ring having at least one of a canted coil spring, a ribbon spring, an elastomer, or a V-spring disposed therein.

23. The seal assembly of claim 22, wherein the groove comprises two sidewalls and a bottom wall located therebetween.

24. The seal assembly of claim 23, wherein the groove is located at an outer diameter of the rigid support ring or the backup ring.

25. The seal assembly of claim 24, further comprising an outer bearing on the rigid support ring or backup ring spaced from an inner bearing, the outer bearing comprising multi-point contacts defined by a recess, and wherein the inner bearing and the outer bearing cooperatively stabilize the seal assembly against the shaft, minimize gaps between the shaft and a bore, and provide a bearing surface to guide the shaft.

* * * * *